US011596255B2

(12) United States Patent
Cotton-Betteridge et al.

(10) Patent No.: US 11,596,255 B2
(45) Date of Patent: Mar. 7, 2023

(54) SYSTEMS AND METHODS FOR DELIVERING UNCONTAMINATED FOOD ORDERS

(71) Applicants: Stephanie Cotton-Betteridge, Highland, UT (US); Samuel Cotton-Betteridge, Highland, UT (US)

(72) Inventors: Stephanie Cotton-Betteridge, Highland, UT (US); Samuel Cotton-Betteridge, Highland, UT (US)

( * ) Notice: Subject to any disclaimer, the term of this patent is extended or adjusted under 35 U.S.C. 154(b) by 33 days.

(21) Appl. No.: 17/020,551

(22) Filed: Sep. 14, 2020

(65) Prior Publication Data
US 2022/0079366 A1 Mar. 17, 2022

(51) Int. Cl.
A47G 29/14 (2006.01)
H04W 4/021 (2018.01)
G06Q 10/08 (2012.01)
G06Q 10/0832 (2023.01)

(52) U.S. Cl.
CPC ....... A47G 29/141 (2013.01); G06Q 10/0832 (2013.01); H04W 4/021 (2013.01); A47G 2029/143 (2013.01)

(58) Field of Classification Search
CPC .. G06Q 10/0832; G06Q 20/20; G06Q 20/206; G06Q 20/355; G06Q 20/385; G06K 19/00; A47G 29/141

USPC .............................. 235/382.5, 382, 375, 487
See application file for complete search history.

(56) References Cited

U.S. PATENT DOCUMENTS

| | | | | |
|---|---|---|---|---|
| 2019/0130689 A1* | 5/2019 | Baumgarte | ........ | G07C 9/00571 |
| 2019/0256119 A1* | 8/2019 | Brilhante | ................ | B62B 3/004 |
| 2020/0160263 A1* | 5/2020 | Kuettner | ............ | G06Q 10/0832 |
| 2020/0231366 A1* | 7/2020 | Väin | ........................ | H04Q 9/00 |
| 2020/0401995 A1* | 12/2020 | Aggarwala | ........... | G06F 16/901 |
| 2021/0065103 A1* | 3/2021 | Hauser | ................ | G06Q 50/265 |

FOREIGN PATENT DOCUMENTS

| | | | | |
|---|---|---|---|---|
| CN | 207826566 U | * | 9/2018 | |
| JP | 2003246459 A | * | 9/2003 | |
| KR | 20490787 Y1 | * | 1/2020 | .......... A47J 41/0066 |
| WO | WO-2020223440 A1 | * | 11/2020 | |
| WO | WO-2020223545 A1 | * | 11/2020 | |

* cited by examiner

Primary Examiner — Edwyn Labaze
(74) Attorney, Agent, or Firm — Dax D. Anderson; Kirton McConkie

(57) ABSTRACT

A food delivery container for delivering food that is not contaminated during delivery. The container is locked with an electromechanical lock that is keyed with a unique electronic code or key that is generated during the ordering process based on information collected from the consumer. The electronic key is transmitted to the user's electronic device, such as a phone, and the user transmits the key from the electronic device to the lock to unlock the container.

14 Claims, 7 Drawing Sheets

SYSTEMS AND METHODS FOR DELIVERING UNCONTAMINATED FOOD ORDERS

TECHNICAL FIELD

The present disclosure relates generally to a delivery container. More particularly, the disclosure relates to systems and methods for delivering uncontaminated food in a lockable container wherein the consumer has the key.

BACKGROUND

Retail food delivery is a courier service in which a restaurant, store, or independent food-delivery company delivers food to a customer. An order is typically made either through a restaurant or grocer's website or phone, or through a food ordering company. The delivered items can include entrees, sides, drinks, desserts, or grocery items and are typically delivered in boxes or bags. The delivery person will normally drive a car, but in bigger cities where homes and restaurants are closer together, they may use bikes or motorized scooters.

Customers can, depending on the delivery company, choose to pay online or in person, with cash or card. A flat rate delivery fee is often charged with what the customer has bought. Sometimes no delivery fees is charged depending upon the situation. Tips are often customary for food delivery service. Contactless delivery may also be an option.

Orders are being done through their delivery websites, mobile apps, or by phone. Time of delivery usually takes around 30 to 45 minutes.

It is estimated that online restaurant ordering is growing 300% faster than dine-in traffic. "Online ordering has started to become the norm, thanks to the convenience, accuracy, and ability to integrate payments. The rise of a global pandemic has further fueled growth of food deliveries as a way to maintain social distance while still enjoying restaurant fare. At scale, ubiquitous on-demand and subscription delivery of prepared food could potentially spell the end of cooking at home."

In the US, the top three restaurant food delivery services are DoorDash, GrubHub, and UberEats, which together account for some 80 percent of the sector's revenue. As the number of restaurant food delivery systems has increased, so have the logistical challenges of tracking online orders—restaurants using delivery services usually must have each service's tablet or iPad to receive orders, which then must be transferred into the restaurant's own Point of Sale (POS) system. To streamline this, software-as-a-service companies have emerged to integrate the online ordering, billing and dispatching of restaurant food orders. In addition to providing online ordering software for restaurant chains (e.g. Applebee's, Cheesecake Factory, Chipotle, Shake Shack), these SaaS companies' digital platforms also provide data analysis that these restaurants use for medium- and long-term planning.

Despite the growing food-delivery market certain challenges exist. Current food delivery containers are designed based on pre-pandemic conditions. Standard food delivery containers can be opened, either intentionally or accidentally, and exposed to a contagion such as COVID-19. Thus a need exists for a system and method for a food-delivery container which allows the consumer to control access to his or her ordered food.

BRIEF SUMMARY

The general purpose of the systems and methods disclosed herein is to provide improved cleanliness of food delivery containers. Specifically, the present invention teaches delivering food in locked containers which can be opened by the consumer. In some embodiments the key to the locked container is an electronic code sent to the customer. In some embodiments a new key is generated and electronically transmitted to the consumer. In some embodiments the new key is based on the time the order was placed, the address to which the food is to be delivered, the consumer's phone number, and other information unique to the consumer.

In one non-limiting embodiment, the system for delivering uncontaminated food comprises a consumer placing a food order, wherein the food order is delivered in a lockable food-delivery container. In some embodiments the key to the lock is electronic and can be electronically transferred from the party that loads the food into and locks the container to the consumer receiving the delivery. In some embodiments the food container is delivered to the consumer, whereupon the container is opened by the consumer using the electronically transferred key.

Reference throughout this specification to features, advantages, or similar language does not imply that all of the features and advantages that may be realized with the present disclosure should be or are in any single embodiment of the invention. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment, but may refer to every embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The features and advantages of the present disclosure will become more fully apparent from the following description and appended claims, or may be learned by the practice of the invention as set forth hereinafter.

BRIEF DESCRIPTION OF THE DRAWINGS

In order to describe the manner in which the advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Figure 1:
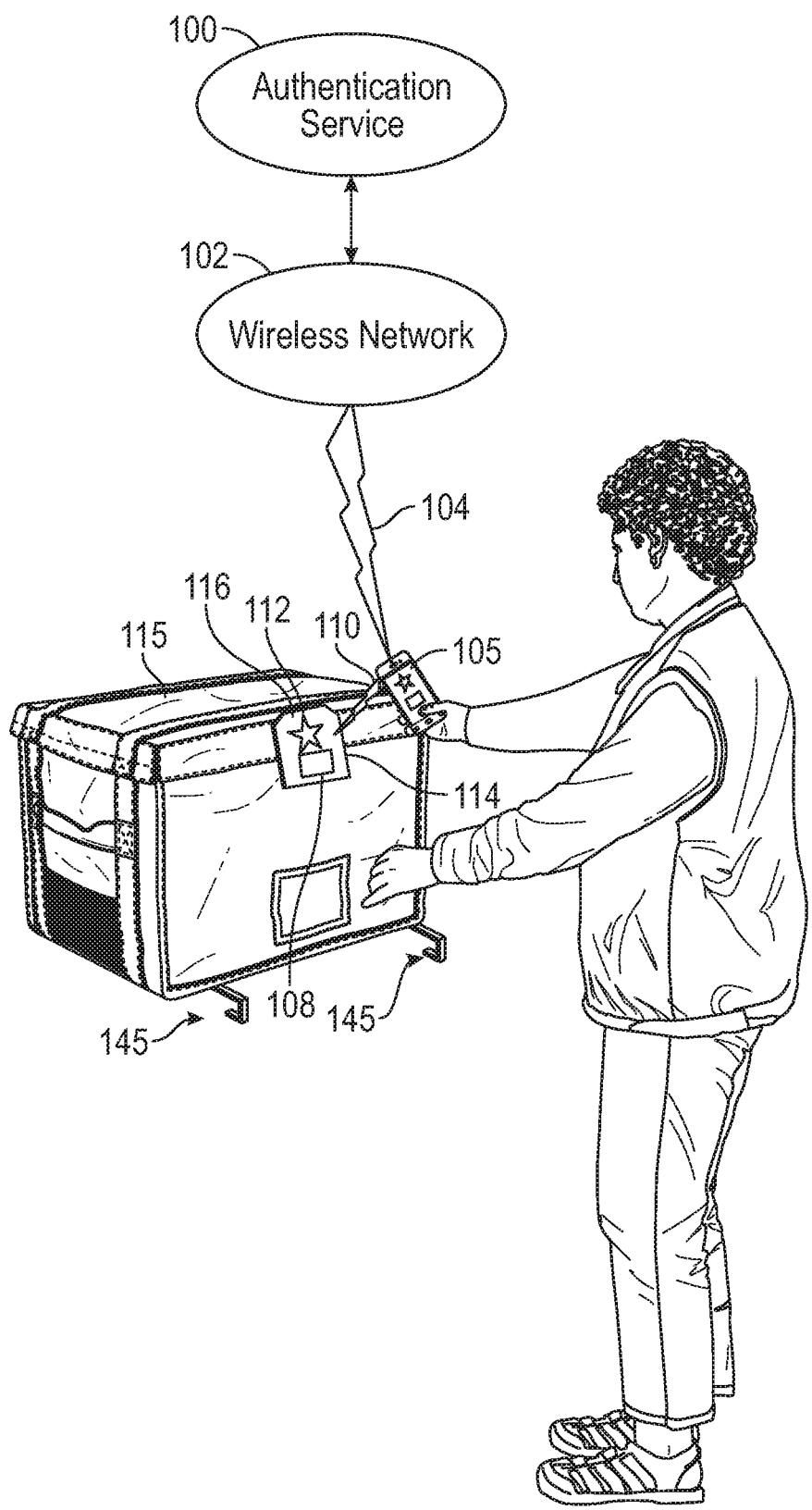
FIG. 1 illustrates an environment within which systems and methods for locking a food order and electronically sending the key to the customer can be implemented, according to an example embodiment.

The present embodiments of the present disclosure will be best understood by reference to the drawings, wherein like parts are designated by like numerals throughout. The drawings show illustrations in accordance with exemplary embodiments. These exemplary embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. It will be readily understood that the components of the disclosed invention, as generally described and illustrated in the figures herein, could be arranged and designed in a wide variety of different configurations. Thus, the following more detailed descriptions of the embodiments of the apparatus, as represented in FIGS. 1-6B are not intended to limit the scope of the invention, as claimed, but are merely representative of present embodiments of the invention.

In general, the figures disclose an invention that provides systems and methods for delivering uncontaminated food in a selectively lockable food-delivery container wherein the lock's key is uniquely generated at the time the order is placed and then the key is electronically transferred to the consumer. In one example embodiment, a system for delivering uncontaminated food may be implemented on a plurality of platforms, websites, or mobile applications. A user may be the person preparing and placing the food into the container, the fulfilment company, the person ordering the food for himself or herself, the person ordering the food on behalf of another, or the person paying for the order. A user may access an application or website associated with the system. The user may create a user profile on the website. During the registration process, the user may provide user data to the system, such as an email, a phone number, links to profiles of the user in social networks, and any other user-specific data. The user may further provide a food order to the system. The food order may include pre-prepared food, fast food, grocery food, meal kits and so forth. The fulfillment company may prepare uncontaminated food for delivery and prepare the order for placement in the container. The fulfillment company may place the food in the container and lock the container. Alternatively the fulfillment company may provide the food to the delivery company, which then places the food in the container. The container may comprise a lock. Once the food is in the container the lock is engaged to ensure the food delivery remains inaccessible and uncontaminated until it arrives at its delivery destination. In some embodiments a unique key configured to open the lock is electronically delivered to the user. The lock may be in connection with a wireless network. The lock may be selectively locked after uncontaminated food is placed therein. The system may further comprise a key configured to unlock the lock. The key may be an electronic file that is electronically transmitted to the user. The food may be delivered to the user who may then unlock the delivered container and removed the uncontaminated food.

In the following description, numerous references will be made to delivery mechanisms, containers and wireless networks, but these items are not shown in detail in the figures. However, it should be understood that one of ordinary skill in the art and in possession of this disclosure, would readily understand how the present disclosure and existing delivery mechanisms, containers and wireless networks structures can be incorporated.

Detailed references will now be made to the preferred embodiments of the disclosed invention, examples of which are illustrated in FIGS. 1-6B illustrate various views of a system and method for delivering uncontaminated food 5 in accordance with one or more embodiments of the invention. In an embodiment of the invention, an electronic key is utilized for wirelessly opening an electromechanical wireless lock. The key may be carried by a person as a part of his wireless communication device. FIG. 1 shows an embodiment of an electronic locking system. A user 105 is about to open a container 115. The user has a communication device 106.

The communication device 106 refers to a portable computing device. Such computing devices include wireless mobile communication devices operating with or without a subscriber identification module (SIM), including, but not limited to, the following types of devices: mobile phone, smartphone, personal digital assistant (PDA), handset. The communication device 106 may have a wireless network channel 104 connection to a wireless network 102. The wireless connection channel 104 and the wireless network 102 may be implemented according to the GSM (Global System for Mobile Communications), WCDMA (Wideband Code Division Multiple Access), WLAN (Wireless Local Area Network) or any other suitable standard/non-standard wireless communication means.

In an embodiment, the communication device 106 comprises a Subscriber Identity Module (SIM) or a Universal Integrated Circuit Card (UICC). The SIM and the UICC are used in mobile communication systems to identify subscribers. Each communication device of a given system comprises such an identification. The SIM and the UICC comprise an integrated circuit capable of performing computations and storing data.

The communication device 106 is equipped with a short-range wireless communication unit configured to communicate with other respective short-range units upon detecting such a unit.

In an embodiment, short-range wireless communication is realised with a Near Field Communication (NEC) technique. NFC is a standardized wireless communication technique designed for data exchange between devices over short distances. A typical working distance is about 0 to 20 centimeters. NFC uses a given frequency (13.56 MHz). NFC transceivers may be active, semi-passive or passive.

Active transceivers comprise a power source which is used to power the transceiver components and the transmission. Passive transceivers comprise do not comprise a power supply. They receive the operating power wirelessly from a magnetic field generated by a nearby NFC transmission. Thus, they are active only when an active transceiver transmits within the coverage area of the transceiver. Passive transceivers do not consume power when they are in an idle state. Typically, passive transceivers are RFID (Radio-frequency identification) tags which comprise a memory circuit and a passive transmitter which is configured to respond to an NFC transmission query. Semi-passive transceivers comprise a power supply but the power supply is used to power a microchip of the transceiver but not to broadcast a signal. To transmit a semi-passive device needs to be powered by an active transceiver.

The container 115 comprises an electromechanical lock 116. The lock comprises a lock interface 108, a lock antenna 112 and an optional lock latch 114. The lock antenna 112 is connected to an electronic circuitry of the lock (not shown in FIG. 1). The circuitry comprises a short-range communication device. The device may be an NFC transceiver. In an embodiment, the NFC transceiver of the lock is a passive transceiver. In some embodiments, the lock antenna 112 may be connected to a short-range communication network such as Bluetooth, Wi-Fi direct, or infrared data association (IrDA).

When the user approaches the container he wishes to lock, he brings the communication device 106 close to the lock antenna 112. The electronic circuitry of the lock is powered by the short-range transmission of the communication device and a transaction is initiated. The communication device reads an authentication challenge from the electronic circuitry of the lock. The communication device 106 computes a response and transmits the response to the electronic circuitry of the lock. Next, the user operates the user interface 108 of the lock. The operating may comprise shutting a delivery container. The operation activates the lock and provides operating power for the lock to perform the authentication. In the authentication, the lock authenticates the response. In an embodiment, the response is authenticated against the challenge. If the authentication succeeds the lock is set to an closed state and allows the user to operate the lock.

When the user approaches the container he wishes to open, he brings the communication device 106 close to the lock antenna 112. The electronic circuitry of the lock is powered by the short-range transmission of the communication device and a transaction is initiated. The communication device reads an authentication challenge from the electronic circuitry of the lock. The communication device 106 computes a response and transmits the response to the electronic circuitry of the lock. Next, the user operates the user interface 108 of the lock. The operating may comprise opening a delivery container. The operation activates the lock and provides operating power for the lock to perform the authentication. In the authentication, the lock authenticates the response. In an embodiment, the response is authenticated against the challenge. If the authentication succeeds the lock is set to an openable state and allows the user to operate the lock. In some embodiments, the user 105 may remotely operate the lock 116. In these embodiments, the lock antenna 112 may operate as a long-range receiver subject to radio-frequency remote control. In some embodiments, the user may share the key to the locked container with another user wirelessly or using an authentication system or method.

In the above-described embodiment, the physical key does not perform any authentication but provides the activation of the operating power of the lock. In some embodiments, the key may provide some additional authentication. In other embodiments, the key may serve as a backup method to operate the lock, in the event an electronic key is lost or fails and needs to be overridden by a user.

In an embodiment, the communication device 106 signals the challenge read from the electronic circuitry of the lock to an authentication service 100 using the wireless network channel 104. The authentication service 100 may calculate the response and transmit it to the communication device 106.

In an embodiment, the authentication service may record an audit trail of actions related to the locks of the lock systems. Thus, each attempt to secure or open a lock may be viewed later. In addition, the authentication service may utilize a time-limited access rights management. In an embodiment, the lock may store each action in an audit trail. The authentication service may be realized with one or more computers, servers or computing equipment and associated software.

Server systems used in the methods and systems of the present disclosure such as retailer server systems generally comprise at least one processor, a memory that may comprise executable instructions for the processor, and a communications interface configured to transmit data to and receive data from other computer systems or devices. In some embodiments the system may comprise an electrical source such as battery or other power source. The processor may comprise any microprocessor, central processing unit ("CPU"), or other computer processors known in the art, and the communications interface may comprise any type of computer interface device known or used in the art with electronics and computer systems, including but not limited to modems, Ethernet/Wi-Fi/LAN/cellular adapters, serial connections, data bus connections, and other similar types of devices. The processor may include an internal memory device and/or be configured to access a separate memory device or drive comprising executable instructions. Data servers suitable for use in the retailer server systems in the present disclosure include those commercially available from Dell, IBM, and Apple. The retailer server systems also may include multiple redundant servers that operate as mirrors of each other, which may, among other purposes, increase speed of the system and/or help compensate for failures or other problems in the servers.

In particular embodiments, retailer server systems may be network-addressable computing systems that can host one or more retailer's server systems. Retailer server systems may host data accessible to the public on a website, and may generate, store, receive, and transmit various types of data relating to online orders, including but not limited to item-related data (e.g., images, pricing, inventory availability, perishability, customization options, size/weight data, promotional information, and/or other attributes), customer-related data (e.g., names, addresses, phone numbers, e-mail addresses, communication preferences, purchase histories, payment information, etc.), data relating to third-party carriers (e.g., shipment costs, shipment times, etc.), store-related data (e.g., addresses, store departments, inventory, etc.) and the like.

In some embodiments the server is configured to collect information about the order gathered during the order process such as the time the order was placed, the phone number or IP address used to place the order, codes associated with items ordered, the time the order was completed, or the payment method, or digits from the payment method used. In some embodiments the unique key code is created based on the root of the sum of the numbers. In some embodiments the key is generated based on the root mean square of the numbers gathered. In some embodiments key is generated based on the root of the average of the numbers gathered. In some embodiments the key is based on the multiplying the number gathered from the data by a constant or revolving set of constants, such as PI to a set number of digits or an arbitrary constant selected by the provider fulfilling the order.

Any suitable authentication technique may be used in connection with the embodiments of the present invention. The selection of the authentication technique depends on the desired security level of the lock 106 and possibly also on the permitted consumption of electricity for the authentication (especially in user-powered electromechanical locks)

In an embodiment, the authentication is performed with a SHA-1 (Secure Hash Algorithm) function, designed by the National Security Agency (NSA). In SHA-1, a condensed digital representation (known as a message digest) is computed from a given input data sequence (known as the message). The message digest is to a high degree of probability unique for the message. SHA-1 is called "secure" because, for a given algorithm, it is computationally infeasible to find a message that corresponds to a given message digest, or to find two different messages that produce the same message digest. Any change to a message will, with a very high probability, result in a different message digest. If the security needs to be increased, other hash functions (SHA-224, SHA-256, SHA-384 and SHA-512) in the SHA family, each with longer digests, collectively known as SHA-2 may be used.

In an embodiment, the challenge comprises a lock system id, a lock id, access data and a check value. The lock system id identifies the lock system to which the lock belongs. The lock id identifies the lock in the lock system. Each lock in a lock system may comprise a unique identification. The access data may be random numeric data. The check value is a cyclic redundancy check value confirming the integrity of the challenge.

In an embodiment, the authentication service or the communication device calculating the response may determine on the basis of the response whether the authentication will succeed or not. The communication device 106 may inform the user whether the authentication will succeed or not.

In an embodiment, a Personal Identification Number (PIN) or finger print data of the user of the communication device may be used when generating a response for the challenge. The communication device may comprise a finger print data reader configured to read a finger print and generate a numeric presentation on the basis of the finger print.

The challenge may comprise a PIN or finger print query. The user of the communication device may type in the PIN or use the finger print data reader of the communication device. The communication device is configured to send the PIN or the numeric presentation of the finger print as a response to the challenge. The lock may be configured to store a set of PINs and finger prints which allow the opening or securing of the lock. The electronic circuitry of the lock compares the response to the stored values and if a match is found, the authentication is deemed to be successful.

Figure 2:
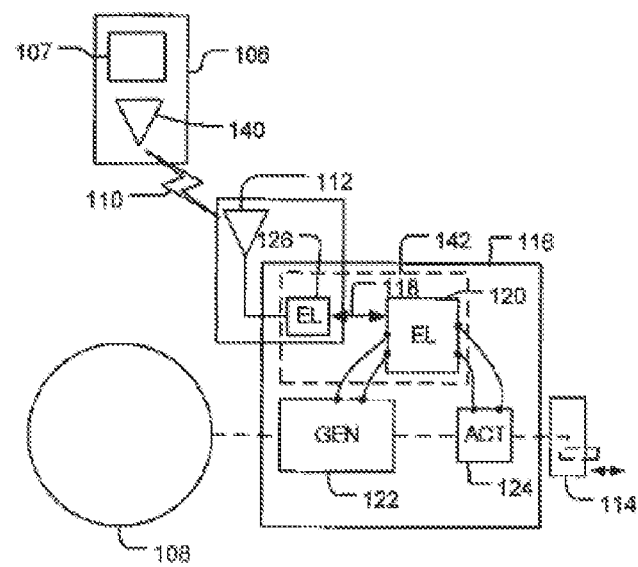
FIG. 2 illustrates an embodiment of an electronic authentication system.

FIG. 2 shows a more detailed example of an electromechanical lock 116 and a communication device 106. The communication device comprises a short-range communication unit 140. In an embodiment, the short-range communication unit 140 is an NFC transceiver of active type. The communication device 106 may comprise a wireless transceiver 107 for realizing a wireless network channel connection to a wireless network, such as a GSM network, a WCDMA network or a WLAN network or any other suitable standard/non-standard wireless communication network.

The lock 116 comprises an electric circuitry 142. The lock further comprises a user interface 108 and a generator 122 which is configured to power the lock 116 when the user interface of the lock is operated.

The electronic circuitry 142 may be implemented as one or more integrated circuits, such as application-specific integrated circuits ASIC. Other embodiments are also feasible, such as a circuit built of separate logic components, or memory units and one or more processors with software. A hybrid of these different embodiments is also feasible. When selecting the method of implementation, a person skilled in the art will consider the requirements set on the power consumption of the device, production costs, and production volumes, for example. The electronic circuitry 142 may be configured to execute computer program instructions for executing computer processes.

In the embodiment of FIG. 2, the electronic circuitry 142 is realized with two circuits. The circuitry comprises a communication unit 128 and a lock electronics circuit 120 which are connected to each other with a communication channel 118. In an embodiment, the lock electronics circuit 120 is realized with a microcontroller and a memory unit.

The lock further comprises an antenna 112 connected to the communication unit 126. In an embodiment, the communication unit 126 is an NFC transceiver of passive type.

The lock further comprises an actuator 124 which controls a lock latch 114. After a successful authentication the actuator 124 is configured to set the lock in a mechanically openable state. The actuator may be powered by electric power produced with the generator 108. The actuator 110 may be set to a locked state mechanically, but a detailed discussion thereon is not necessary to illuminate the present embodiments.

When the actuator 124 has set the lock in a mechanically openable state, the latch mechanism 114 can be moved by operating the user interface 108, for example. Other suitable operating mechanisms may be used as well.

Figure 3:
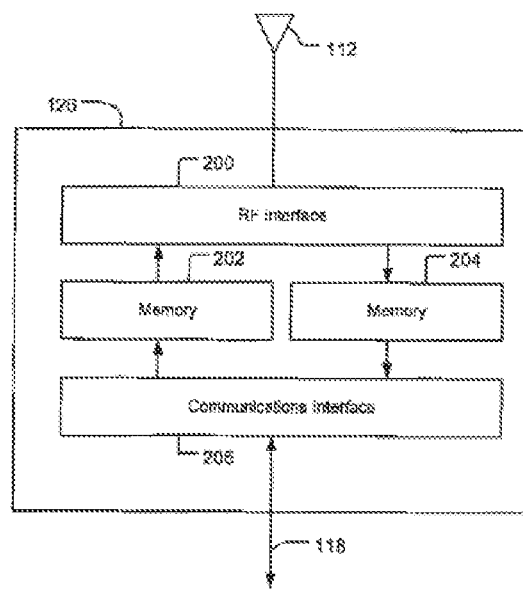
FIG. 3 illustrates an embodiment of a self-powered electronic locking system.

FIG. 3 illustrates an embodiment of the communication unit 126. It may consist of a communication interface 200 between the antenna 112 and two memory units 202, 204. The communication interface 200 with memory units 202, 204 may be an NFC transceiver of a passive type. When the antenna 112 is within the operating range of an active NFC device (for example the communication device 106 of FIGS. 1 and 2) the communication unit 126 is powered through the antenna 112 by the magnetic field generated by the active NFC device. The memory unit 202 is configured to store an authentication challenge and the memory unit 204 is configured to store an authentication response. The active NFC device powers the communication interface 200 with memories 202, 204, reads the challenge wirelessly from the memory unit 202 and stores the response wirelessly in the memory unit 204.

When the user interface of the lock is operated the communication unit 126 is powered by the generator 122 of FIG. 1B through the interface 206 using the communication channel 118. The lock electronics 120 read the response from the memory 204 and write a new challenge to the memory unit 202.

The memory unit 202 may be permanent memory realized with Flash or EEPROM technology, for example. The memory unit 204 may be non-permanent memory realized with RAM or DRAM technology, for example. The communication unit 126 is configured to store a response in the memory unit 204 only for a predetermined time; otherwise a security risk occurs if a lock is not operated after writing the response. The communication interface 206 illustrates an example of a communication interface between the memory units 202, 204 and the lock electronics 120. A read operation of the memory unit 204 and write operation of the memory unit 202 are powered by the lock when operated.

Figure 4:
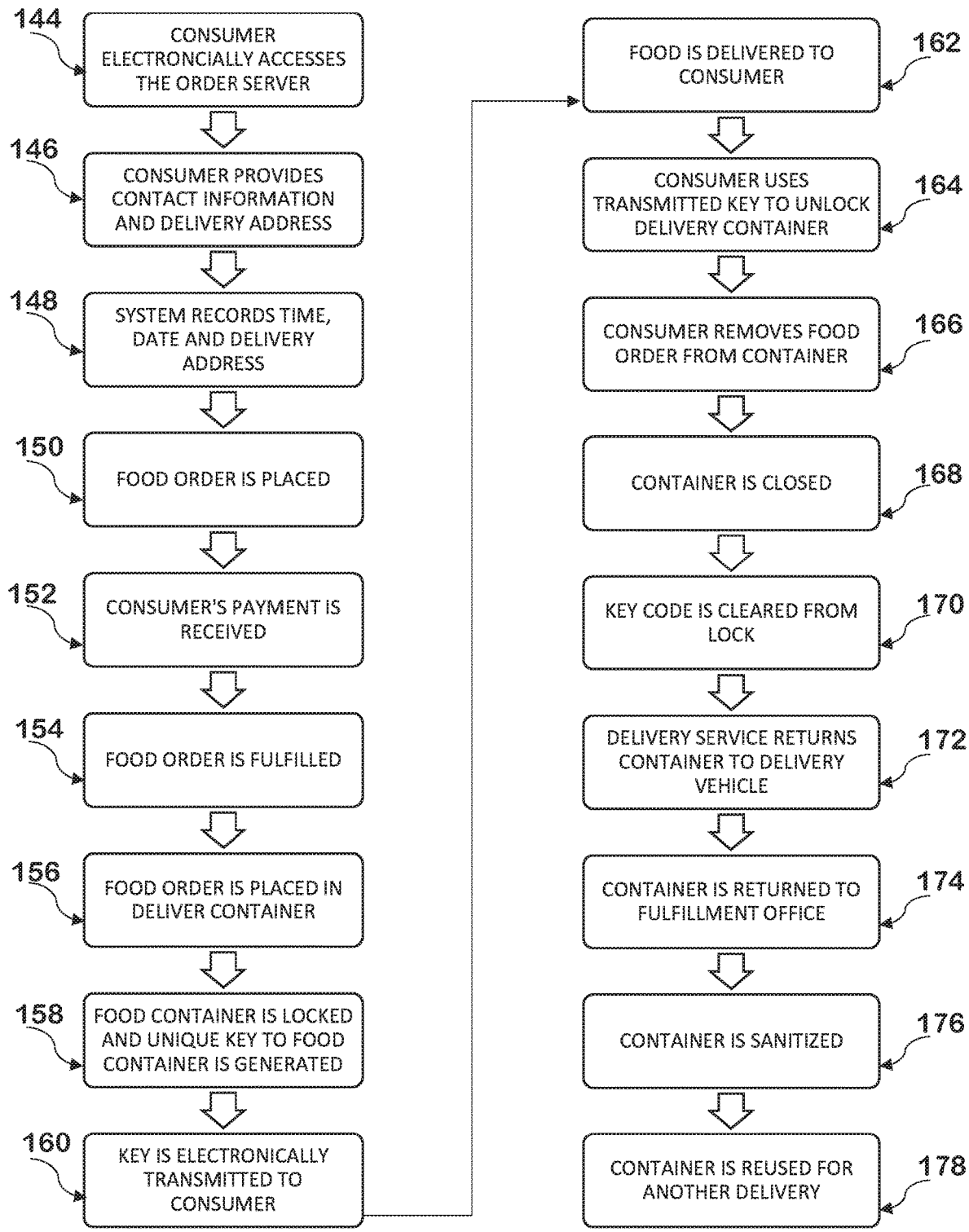
FIG. 4 illustrates an embodiment of a communication unit.

FIG. 4 includes a flowchart illustrating embodiments of the invention. In some embodiments the consumer accesses servers used to process orders 144. In some embodiments the consumer provides contact information and delivery address for the food delivery 146. In some embodiments the system records information related to the order, such as the time the order was placed, the phone number or IP address used to place the order, codes associated with items ordered, the time the order was completed, or the payment method used 148. In some embodiments the order is completed 150 and payment is received 152. In some embodiments the food order is fulfilled when the food is prepared 154.

In some embodiments the prepared food is placed into a delivery container 156 in preparation for delivery. In some embodiments the container is locked and a unique electronic key for the lock is generated 158 using information about the order gathered during the order process eg. the time the order was placed, the phone number or IP address used to place the order, codes associated with items ordered, the time the order was completed, or the payment method, or digits from the payment method used. In some embodiments the unique key code is created based on the root of the sum of the numbers. In some embodiments the key is generated based on the root mean square of the numbers gathered. In some embodiments key is generated based on the root of the average of the numbers gathered. In some embodiments the key is based on the multiplying the number gathered from the data by a constant or revolving set of constants, such as PI or an arbitrary constant selected by the provider fulfilling the order. In any event, the key is a unique key among the keys generated by that fulfillment organization in the limited time that multiple keys are being used. In some embodiments the key is electronically transmitted to the consumer 160. In some embodiments the key is selected by the consumer during the check-out process, and thus does not need to be selected by the consumer because it is already in the consumer's possession. In some embodiments the food container is delivered the location designated during the ordering process 162. This may be the consumer who paid for the food, or it may be to another person, such as when parents order delivery for their children.

In some embodiments the container is opened using the transmitted key 164, wherein the code is entered through any of the transmission techniques described herein such as NFC, Bluetooth™, WIFI, or radio signal. Once unlocked, the consumer removes the food from the container 166. In some embodiments the container comprises a plurality of smaller compartments 113 configured to transport multiple deliveries in a single container. In some embodiments the container is not locked, but the container comprises a plurality of individually locked compartments 113 (see FIG. 6B) within the container, wherein each compartment 113 within the container requires a separate code to unlock. In some embodiments the container is closed 168 after the food is removed. In some embodiments the key is cleared after it is entered, whereon the container is returned 172-174 sanitized 176 and prepared for another delivery 178. These steps may be performed in any order and steps may be skipped or combined without changing the nature of the invention. Here it is assumed that by default the electromechanical lock 116 of the container 115 is in a locked state and it remains in the locked state until set to an openable state.

Figure 5A:
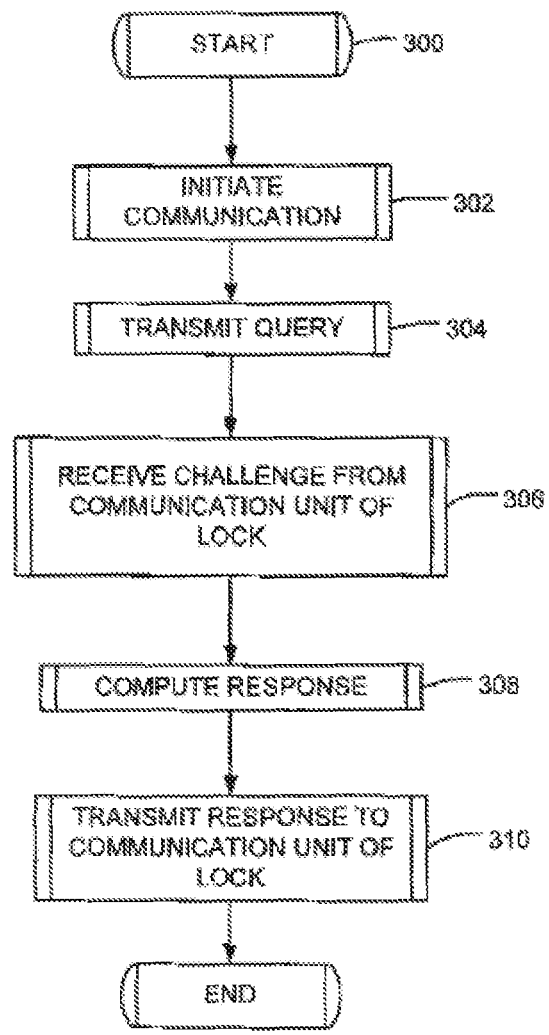
FIGS. 5A, 5B and 5C are flowcharts illustrating embodiments.
Figure 5B:
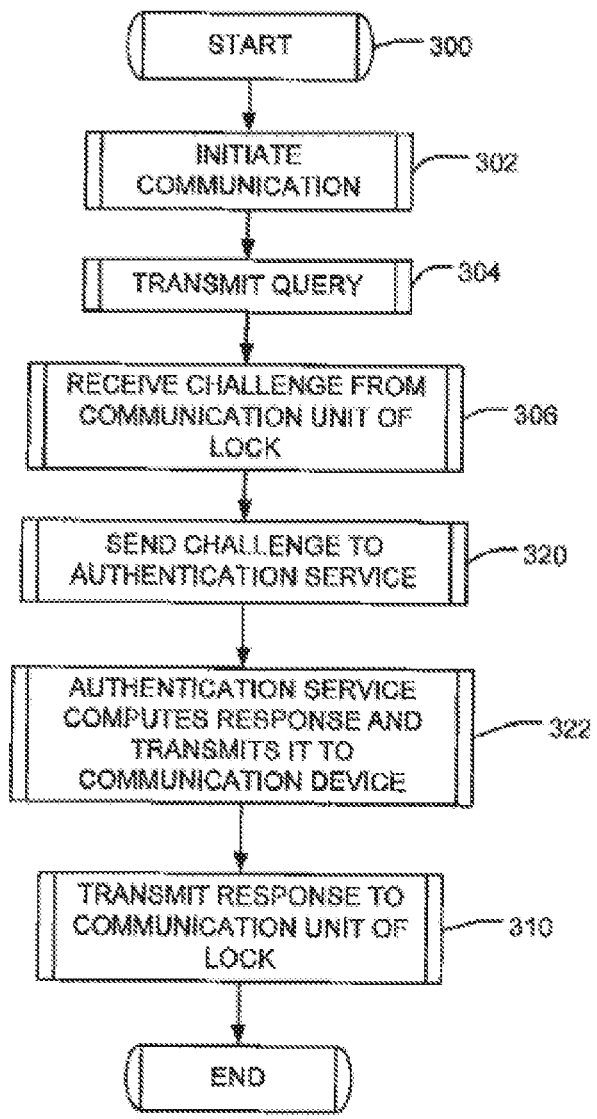
Figure 5C:
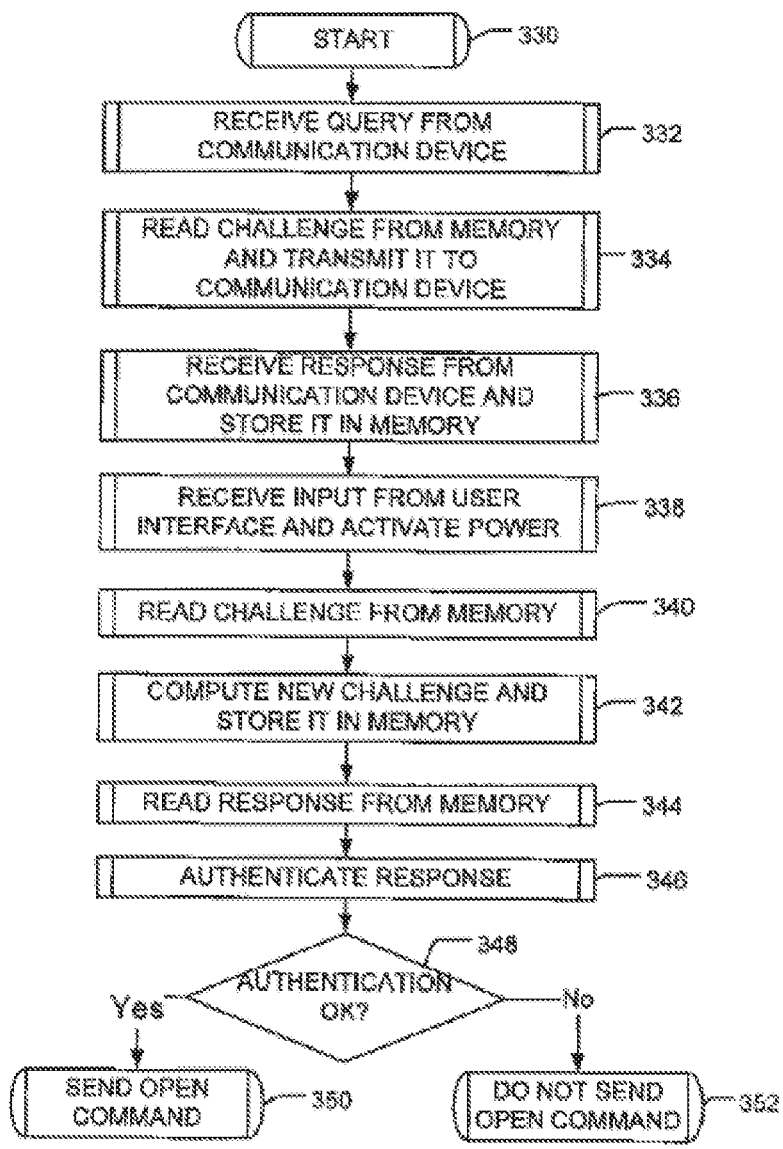

FIGS. 5A to 5C illustrate embodiments from the point of view of the communication device 106.

The opening sequence starts is step 300. The locking sequence is generally similar to the opening sequence.

In step 302, the user of the communication device 106 initiates the communication device. This may comprise switching the NFC transceiver of the communication device on. The communication device is placed so that the lock antenna is within the coverage area of the NFC transceiver of the communication device. For example, the user may touch the lock antenna with the communication device.

In step 304, the communication device 106 transmits an NFC query to the lock.

In step 306, the communication device receives the current challenge sent by the lock.

In step 308 of FIG. 5A, the communication device 106 computes a response. In an embodiment, the response is computed by the processing unit of the communication device 106. In an embodiment, the response is computed in a Subscriber Identity Module (SIM) or a Universal Integrated Circuit Card (UICC) located in the communication device 106.

FIG. 5B illustrates another embodiment, where the communication device 106 transmits the challenge to the authentication service 100 in step 320.

In step 322 of FIG. 5B, the authentication service 100 computes a response to the challenge and sends it to the communication device 106. This embodiment enables a time-limited access rights management and audit trail recording to the authentication service 100. From thereon, the process continues as in FIG. 5A in the following manner.

In step 310, the communication device 106 transmits the response to the communication unit of the lock 116.

FIG. 5C illustrates embodiments from the point of view of the electromechanical lock 116.

The opening sequence starts is step 330.

In step 332, the communication unit 126 is powered by the transmission of the communication device 106 and the unit receives a query from the communication device.

In step 334, the current challenge is read from the memory 202 and transmitted from the interface 200 to the communication device using the antenna 112.

In step 336, the interface 200 of the communication unit receives a response from the communication device 106. The interface stores the response in the memory 204. The memory 204 is configured to store the response for a predetermined time period.

The above operations in the communication unit 126 are powered by the NFC transmission of the communication device.

In step 338, the lock receives a user input from the user interface of the lock. The input activates power for the rest of the opening sequence operations.

In step 340, a lock electronics circuit 120 reads the current challenge from its internal memory where it is stored.

In step 342, the lock electronics circuit 120 computes a new challenge and stores it in its internal memory and in the memory 202 via the channel 118 and the interface 206.

In step 344, the lock electronics circuit 120 roads the response from the memory 204 via the channel 118 and the interface 206.

In step 346, the lock electronics circuit 120 authenticates the response. In an embodiment, the lock electronics circuit 120 authenticates response against the challenge.

In step 348 it is checked whether the authentication was successful.

If it was, the lock electronics circuit 120 sends an open command to the actuator 124 of the lock in step 350. The actuator 124 sets the lock into an openable state.

If the authentication failed, the lock electronics circuit 120 does not send an open command to the actuator 124 of the lock in step 352 and the lock remains in a locked state.

Above, step 338 comprised the activation of power for the lock on the basis of the input from the user. The input operations on the user interface may comprise opening a delivery container. The operation activates the lock and provides operating power for the lock to perform authentication.

In embodiments utilizing the lock structure of FIG. 1B, the operating of the user interface 108 of the lock enables the generator to power the lock 116. The generator may generate electricity from moving the delivery container.

FIGS. 4A, 4B, and 4C illustrate examples of other embodiments of an electronic locking system.

In the example of FIG. 2, the lock antenna 112 is embedded in the lock 108. In this embodiment, the container opening sequence may comprise the following steps. At first, a user touches the lock 108 by a communication device 106. In the second phase, the lock 108 is turned by the user 105 to activate power for authentication and set the lock 116 to an openable state. In the third phase, turning the lock 108 operates the latch 114. In addition, a lever type operation interface can be used instead of a latch structure. The user experiences the second and the third phase as one opening the delivery container.

Some embodiments comprise a fob 134 wherein the lock antenna 112 is located on the container and a fob 134 is used for operating a lock 116. The user interface of the lock comprises a fob receiver 144. In this embodiment the container opening sequence may comprise the following steps. At first, a user touches the antenna 112 with the communication device 106. In the second phase, the fob 134 is inserted into the fob receiver 114 of the lock 116 to activate power for authentication and set the lock 116 to an openable state.

Figure 6A:
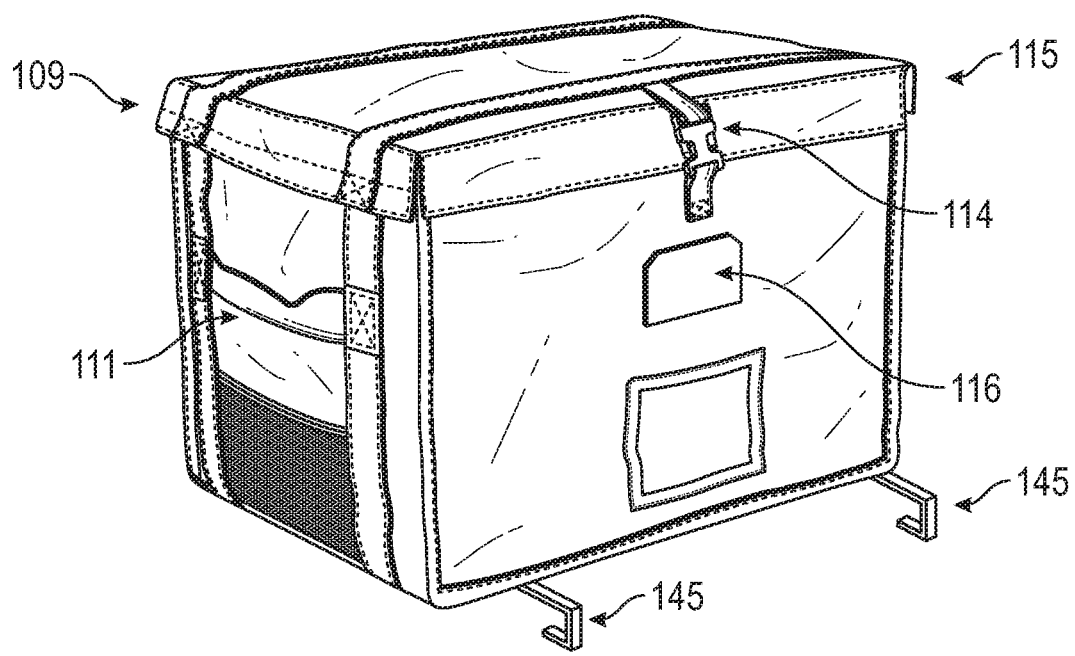
FIGS. 6A and 6B illustrate embodiments of an electronic locking food delivery container.
Figure 6B:
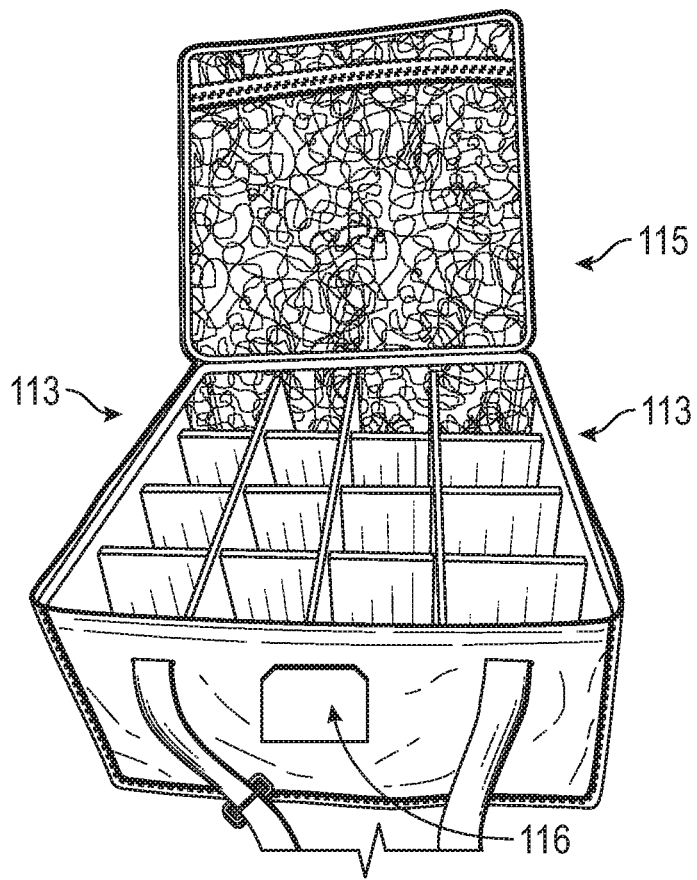

The example of FIGS. 6A-6B illustrate a lock 116, which is a combination of the lock structures of FIGS. 2 and 3. The lock of FIG. 6A may have different operation modes. In an embodiment, the lock 116 authenticates both the key 134 and the response received from the communication device 106. The lock is set into an openable state if both authentications are successful. In some embodiments a seal 109 is formed between the container lid and the container 115 to prevent contamination of the products inside the container 115. In some embodiments the seal 109 is a hermetic seal formed by a rubber or plastic gasket. Is some embodiments the seal 109 is a hermetic seal is a plastic wrap wrapped around the food at the time of delivery. In some embodiments the seal 109 is packaging containing the food being delivered.

In another embodiment, the lock 116 authenticates the response received from the communication device 106. The key 134 is only used to operate the lock mechanism.

In another embodiment, the lock operation may be different for different users. Some users use the key 134 for authentication. Some users (temporary users, for example) use the communication device 106 for authentication and open the lock 116 by opening the delivery container lock 108.

In yet another embodiment, the key 134 may be a key fob, smart card, proximity card, biometric keyless fob, or another hardware token. In some embodiments, the key fob may be a small, programmable hardware device. In some embodiments, the key fob may be operable by both the user and the sender. In some embodiments, a key fob may be used as a skeleton key or override to open the lock 116 in case the communication device 106 fails. In an embodiment, features of the invention are realized as software. Embodiments may be realized as a computer program product encoding a computer program of instructions for executing a computer process carrying out the above described steps for operating an electromechanical lock.

Referring to the container of FIG. 6A, in some embodiments, the exterior of the container may include a fastener 145. In some embodiments, the fastener 145 may couple the container to the seat of a vehicle for more secure transport. The fastener may be coupled to the seat belt buckle or in some embodiments directly to the seat. The fastener 145 may be detachable from the container, adjustable, and/or include another locking mechanism. In some embodiments, the fastener 145 may include hooks as illustrated in FIG. 6A, however other means of coupling the container to the vehicle such as belt and buckles, hook and loop fastener, magnetic, and/or slide lock. In some embodiments, the container may include other exterior handles, straps, and/or fasteners 111 that may be used to improve carrying convenience for the container. For example, in some embodiments, a fastener may be included on the container to hold open the container as shown in FIG. 6B for convenience of placing the food into the container and/or removing the food or sanitizing the container.

In closing, it is to be understood that the embodiments of the disclosure disclosed herein are illustrative of the principles of the present disclosure. Other modifications that may be employed are within the scope of the disclosure. Thus, by way of example, but not of limitation, alternative configurations of the present disclosure may be utilized in accordance with the teachings herein. Accordingly, the present disclosure is not limited to that precisely as shown and described.

The invention claimed is:

1. A container for delivering uncontaminated food comprising:
   a portable delivery container further comprising a locked configuration engaged during transport of the delivery container and an unlocked configuration engaged during the loading and unloading of the delivery container wherein the delivery container comprises a selectively removable lid, and wherein the lid seals with the brim portion of the container;
   an electromechanical lock that transitions the delivery container between the locked configuration and the unlocked configuration; and a key that activates and deactivates the electromechanical lock;
   wherein the key is generated while the delivery container is in the unlocked configuration approximately at the time an order for the food delivery is received based on unique data gathered during the ordering process, wherein the unique key is electronically transmitted to the user through an electronic device;
   wherein after the delivery the user uses the key stored on the electronic device to transition the delivery container to the unlocked configuration and unlock the lock and break the seal that prevented the food from being contaminated during delivery; and
   wherein the locked configuration is engaged in transport of the delivery container and the unlocked configuration is engaged before and after the delivery.

2. The delivery container of claim 1 wherein the seal comprises a hermetic seal.

3. The delivery container of claim 1 wherein the unique key is created by the user during the ordering process.

4. The delivery container of claim 1 the container comprises a plurality of individually locked compartments within the container, wherein each compartment within the container requires a separate code to unlock.

5. The delivery container of claim 4 wherein a key fob is configured to provide the key to the lock wherein the key fob is a skeleton key or override to open the locks in case the communication device fails.

6. The delivery container of claim 1 wherein the key consists of at least one of: the time the order was placed; the phone number or IP address used to place the order; codes assigned to menu items ordered; the time the order was completed: digits provided as part of the payment method used; or the purchase price.

7. The delivery container of claim 1 wherein the key is a number generated from a mathematical manipulation of numbers entered into the server consisting of the root of the sum of the numbers; the root mean square of the numbers; the root of the average of the numbers gathered; or the product of the number gathered from the data multiplied by a constant.

8. The delivery container of claim 1 further comprising securing hooks extending from the delivery container beyond the container configured to secure the delivery container to a vehicle seat.

9. The delivery container of claim 1 wherein the delivery container comprises a geolocation device configured to unlock the delivery container when the delivery container passes a predetermined location.

10. A method for delivering uncontaminated food in a locked delivery container comprising:
   providing an unlocked food delivery container;
   accessing a server configured to receive orders for uncontaminated food;
   generating a unique key based on information recorded during the placement of the order;
   locking the delivery container using the key;
   transmitting the unique key from the server to a locking mechanism coupled to a delivery mechanism wherein the locking mechanism comprises a sensor, a latch and a microprocessor configured to store the unique key;
   electronically transmitting a copy of the unique key to a consumer electronic device;
   transporting the locked food delivery container to the consumer;
   delivering the locked delivery container to the consumer;
   transmitting the copy of the unique key from the consumer device to the sensor;
   comparing the copy of the unique key to the unique key stored on the microprocessor;
   confirming the identity of the copy of the unique key and the unique key;
   unlocking the locking mechanism; and
   opening the delivery container.

11. The method of claim 10 further comprising:
   closing the delivery container;
   sanitizing the delivery container; & returning the delivery container to a delivery hub.

12. The method of claim 10 wherein the data used to generate the unique key code comprises the consumer entering a code while placing the order.

13. The method of claim 10 securing the delivery container to a seat using securing hooks extending from the delivery container beyond the container coupled to the delivery container.

14. The method of claim 10 further comprising unlocking the delivery container using a geolocation device configured to unlock the container when the delivery container passes a predetermined location.

* * * * *